United States Patent
Fujii et al.

(10) Patent No.: US 9,857,875 B2
(45) Date of Patent: Jan. 2, 2018

(54) VIBRATION GENERATION APPARATUS OF ELECTRONIC EQUIPMENT

(71) Applicant: SMK Corporation, Tokyo (JP)

(72) Inventors: Katsuhito Fujii, Tokyo (JP); Takeshi Matsuda, Kanagawa (JP); Yoshinori Watanabe, Kanagawa (JP); Yuki Akita, Kanagawa (JP)

(73) Assignee: SMK Corporation, Tokyo (JP)

( * ) Notice: Subject to any disclaimer, the term of this patent is extended or adjusted under 35 U.S.C. 154(b) by 103 days.

(21) Appl. No.: 14/961,887

(22) Filed: Dec. 8, 2015

(65) Prior Publication Data

US 2016/0259414 A1 Sep. 8, 2016

Related U.S. Application Data (63) Continuation of application No. PCT/JP2015/067375, filed on Jun. 10, 2015.

(30) Foreign Application Priority Data

Mar. 4, 2015 (JP) .................................. 2015-41965

(51) Int. Cl.
   *G06F 3/01* (2006.01)
(52) U.S. Cl.
   CPC .................................. *G06F 3/016* (2013.01)
(58) Field of Classification Search
   None
   See application file for complete search history.

(56) References Cited

U.S. PATENT DOCUMENTS

| 5,604,816 | A | 2/1997 | Totani | |
| 5,866,970 | A * | 2/1999 | Oone | H02N 2/004 310/323.06 |
| 2013/0154984 | A1 | 6/2013 | Gondo | |
| 2015/0169061 | A1* | 6/2015 | Odajima | H02K 33/16 345/173 |
| 2015/0333699 | A1* | 11/2015 | Kim | G06F 3/041 345/173 |

FOREIGN PATENT DOCUMENTS

| JP | 2008-287402 A | 11/2008 |
| JP | 2012-181749 A | 9/2012 |

OTHER PUBLICATIONS

International Search Report for International Application No. PCT/JP2015/067375, issued by the Japan Patent Office dated Sep. 1, 2015.

* cited by examiner

*Primary Examiner* — Kenneth B Lee, Jr.

(57) ABSTRACT

A vibration generation apparatus includes a holder including a receiver disposed with a distance from a vibration target component on the outside thereof, an actuator supported by the receiver and configured to push out one side surface of the vibration target component, and a biasing unit supported by the receiver and configured to bias the other side surface of the vibration target component in a pushing-back direction. The biasing unit includes one or more insulating elastic members opening at both ends thereof and formed in a tubular shape, and the elastic members are interposed between the receiver and the vibration target component side surface in the state in which the elastic members are compressed in a tube diameter direction.

5 Claims, 8 Drawing Sheets

VIBRATION GENERATION APPARATUS OF ELECTRONIC EQUIPMENT

CROSS REFERENCE TO RELATED APPLICATION

The contents of the following Japanese patent application and International patent application are incorporated herein by reference, Japanese Patent Application No. 2015-41965 filed on Mar. 4, 2015, and International Patent Application No. PCT/JP2015/67375 filed on Jun. 10, 2015.

FIELD

The present invention relates to a vibration generation apparatus of electronic equipment configured to vibrate according to operation using a touch panel and the like.

BACKGROUND

Typically, the known electronic equipment with a touch panel and the like includes an apparatus (hereinafter referred to as a "vibration generation apparatus") configured to vibrate a panel-shaped vibration target component such as a touch panel. This allows a user to perceive the sense of operation and information through vibration other than the sense of vision and hearing.

As a vibration generation apparatus of electronic equipment of this type, for example, a vibration generation apparatus, which is configured such that a vibration device is disposed on a back portion of the panel-shaped vibration target component and that the vibration target component vibrates in a thickness direction or a deflection direction by vibration of the vibration device, has been known (see, e.g., Patent Literature 1).

Figure 9:
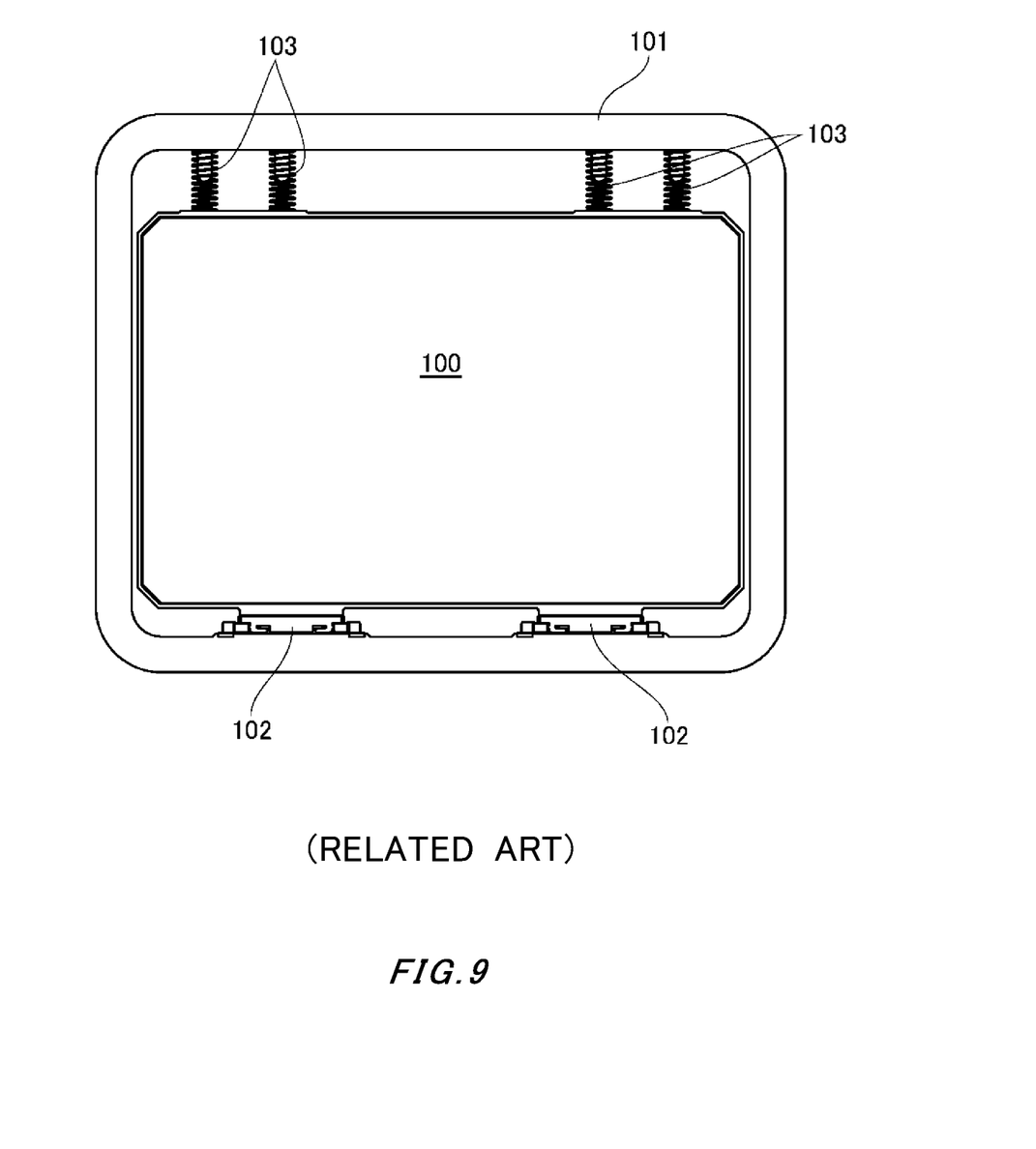
FIG. 9 is a front view illustrating an example of a typical vibration generation apparatus.

Other type of vibration generation apparatus has been developed, which is, as illustrated in FIG. 9, configured such that a frame-shaped holder 101 is disposed outside a panel-shaped vibration target component 100, that actuators 102 configured to move the panel-shaped vibration target component 100 in parallel with the plane thereof are provided between the holder 101 and a side surface of the vibration target component 100, and that vibration is generated by operation of the actuators 102 (see, e.g., Patent Literature 2).

In the vibration generation apparatus of this type, spring members 103 such as coil springs are, on the side opposite to the actuators 102, interposed between the vibration target component 100 and the holder 101. The process of pushing out the vibration target component 100 toward one direction by the actuators 102 and returning the vibration target component 100 to an original point by the biasing force of the spring members 103 in a pushing-back direction is repeated to vibrate the vibration target component 100.

CITATION LIST

Patent Literature

Patent Literature 1: Japanese Patent Application Publication No. 2012-181749

Patent Literature 2: Japanese Patent Application Publication No. 2008-287402

SUMMARY

Technical Problem

However, in the above-described typical technique as described in Patent Literature 1, the structure is employed, in which the vibration device is disposed between the vibration target component and the support panel on the back side. For this reason, the thickness of the entirety of the electronic equipment is increased by such a structure. This leads to hindering of thickness reduction.

On the other hand, in the above-described typical technique as described in Patent Literature 2, it is necessary for the spring members formed of, e.g., the coil springs or rubber to allow the vibration target component to move in the pushing-out direction by the actuators and to ensure a certain level of biasing force in the pushing-back direction. The spring member having spring characteristics meeting such requirements needs to have a certain length in the compression direction thereof, and therefore, the space between the holder and the vibration target component should be expanded by such a length. For this reason, there is a disadvantage that the outer shape of the entirety of the electronic equipment is enlarged.

Moreover, depending on various conditions such as the shape of the vibration target component, the installation angle of the vibration target component relative to the horizontal plane, the position of the center of gravity of the vibration target component, performance of the actuators, and design limitations on a spring member installation position, the required spring characteristics of the spring member of this type vary among types of electronic equipment. In addition, the spring characteristics of the spring member are set exclusively for each type of electronic equipment. For this reason, there are disadvantages that the spring member lacks versatility, that a component cost is increased, and that it is difficult to cope with test production and design change.

In view of the above-described typical disadvantages, the present invention is intended to reduce an entire apparatus size and to provide a vibration generation apparatus of electronic equipment having favorable versatility and a high degree of freedom in design.

Solution to Problem

In order to solve the above-described typical disadvantages and accomplish the intended goal, the features of a first aspect of the present invention, a vibration generation apparatus of electronic equipment including a holder including a receiver disposed with a distance from a vibration target component on the outside thereof, an actuator supported by the receiver and configured to push out one side surface of the vibration target component, and a biasing unit supported by the receiver and configured to bias the other side surface of the vibration target component in a pushing-back direction. The vibration generation apparatus is configured to repeat a pushing-out operation by the actuator and a pushing-back operation by the biasing unit to vibrate the vibration target component. In the vibration generation apparatus, the biasing unit includes one or more insulating elastic members opening at both ends thereof and formed in a tubular shape, and the elastic members are interposed between the receiver and the vibration target component side surface in the state in which the elastic members are compressed in a tube diameter direction.

The features of a second aspect of the present invention are, in addition to the configuration of a first aspect, that the elastic members are arranged such that opening end surfaces thereof are positioned in parallel with the plane of the vibration target component.

The features of a third aspect of the present invention are, in addition to the configuration of a first aspect or a second aspect, that each elastic member is formed to have such an asymmetric end surface shape that the thickness of a wall portion in the tube diameter direction varies according to location.

The features of a fourth aspect of the present invention are, in addition to the configuration of any one of a first aspect to a third aspect, that each elastic member is formed in such a manner that a long tube is cut into rings having a desired length according to a required spring characteristic.

The features of a fifth aspect of the present invention are, in addition to the configuration of any one of a first aspect to a fourth aspect, that the actuator includes a base member having an operation base with one or more operation recesses and fixed to the receiver, and a movable member disposed to face the base member and having, on the side facing the base member, one or more operation raised portions to be inserted into the respective operation recesses, that a linear or strip-shaped shape-memory alloy member shrinkable by heat generated in power distribution is interposed between the base member and the movable member, and that in response to shrinkage of the shape-memory alloy member by the power distribution, the movable member is separated away from the base member to push the vibration target component.

As described above, the vibration generation apparatus of electronic equipment according to an aspect of the present invention includes the holder including the receiver disposed with a distance from the vibration target component on the outside thereof, the actuator supported by the receiver and configured to push out one side surface of the vibration target component, and the biasing unit supported by the receiver and configured to bias the other side surface of the vibration target component in the pushing-back direction. The vibration generation apparatus is configured to repeat the pushing-out operation by the actuator and the pushing-back operation by the biasing unit to vibrate the vibration target component. In the vibration generation apparatus, the biasing unit includes one or more insulating elastic members opening at both ends thereof and formed in the tubular shape, and the elastic members are interposed between the receiver and the vibration target component side surface in the state in which the elastic members are compressed in the tube diameter direction. With this configuration, the size of the entirety of the apparatus can be reduced, and it is easy to cope with test production and design change.

Moreover, according to an aspect of the present invention, the elastic members are arranged such that the opening end surfaces thereof are positioned in parallel with the plane of the vibration target component. With this configuration, the elastic members do not deform in the thickness direction of the vibration target component. Consequently, the space for such deformation is not necessarily ensured, and thickness reduction can be achieved.

Further, according to an aspect of the present invention, each elastic member is formed to have such an asymmetric end surface shape that the thickness of the wall portion in the tube diameter direction varies according to location. With this configuration, adjustment in the direction in which biasing force acts is facilitated.

In addition, according to an aspect of the present invention, each elastic member is formed in such a manner that the long tube is cut into the rings having the desired length according to the required spring characteristics. With this configuration, the elastic member has excellent versatility, and is applicable to obtain various spring characteristics different according to various conditions such as the shape of the vibration target component, the installation angle of the vibration target component relative to the horizontal plane, the position of the center of gravity of the vibration target component, performance of the actuator, and design limitations on a spring member installation position.

Moreover, according to an aspect of the present invention, the actuator includes the base member having the operation base with one or more operation recesses and fixed to the receiver, and the movable member disposed to face the base member and having, on the side facing the base member, one or more operation raised portions to be inserted into the respective operation recesses. The linear or strip-shaped shape-memory alloy member shrinkable by heat generated in power distribution is interposed between the base member and the movable member. In response to shrinkage of the shape-memory alloy member by power distribution, the movable member is separated away from the base member to push the vibration target component. With this configuration, force in the pushing-out direction can be stably applied to the vibration target component.

DESCRIPTION OF EMBODIMENTS

Next, aspects of implementation of a vibration generation apparatus of electronic equipment according to the present invention will be described based on an embodiment illustrated in FIGS. 1 to 8D. Note that a reference character "A"

in the figures denotes a vibration generation apparatus, and a reference numeral "1" denotes a vibration target component such as a touch panel body.

Figure 1:
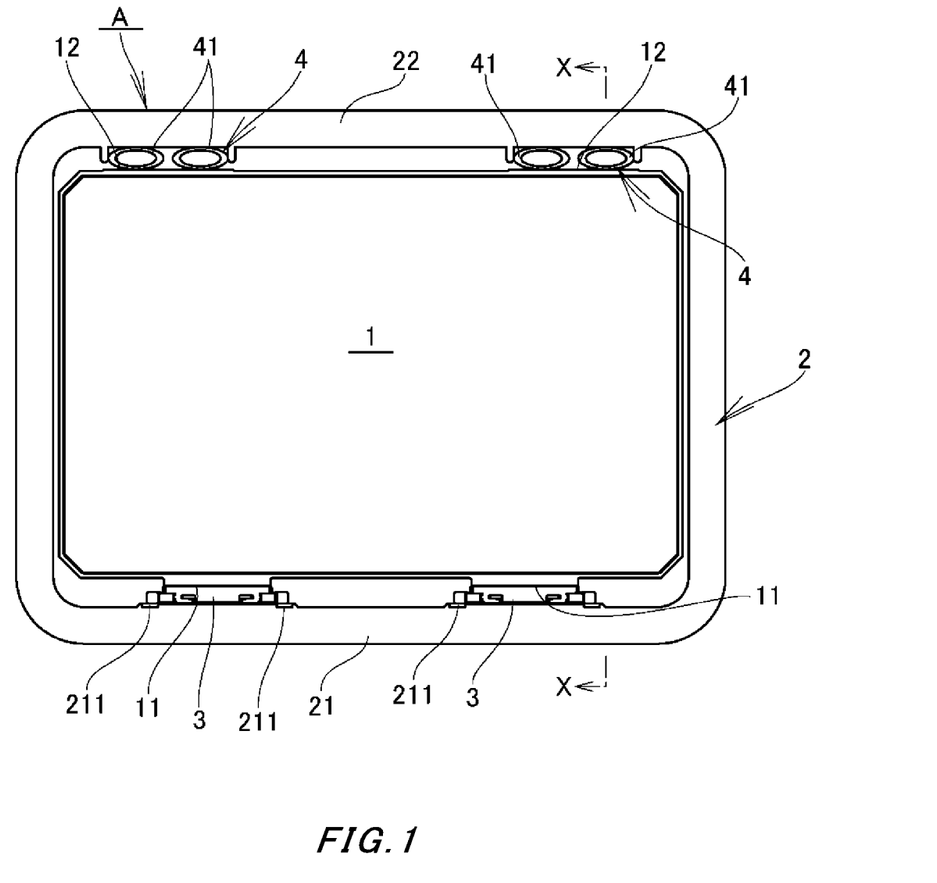
FIG. 1 is a front view illustrating an example of a vibration generation apparatus of electronic equipment according to the present invention.
Figure 2:
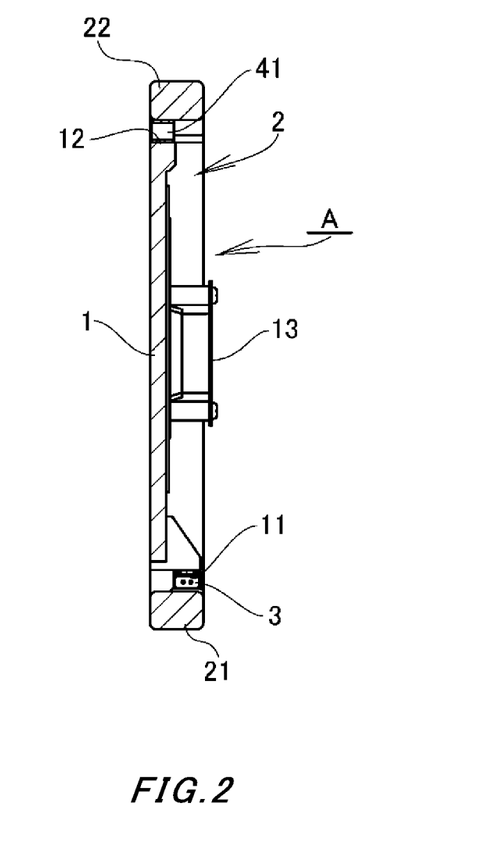
FIG. 2 is a cross-sectional view along an X-X line of FIG. 1.

The vibration generation apparatus A includes a holder 2 having receivers 21, 22 disposed with a distance from the outer periphery of the vibration target component 1, such as a touch panel body, on the outside thereof, actuators 3 supported by the receiver 21 and configured to push out one side surface 11 of the vibration target component 1, and biasing units 4 supported by the receiver 22 and configured to bias the other side surface 12 of the vibration target component 1 in a pushing-back direction. The vibration generation apparatus A is configured to repeat the pushing-out operation by the actuators 3 and the pushing-back operation by the biasing units 4 to vibrate the vibration target component 1 in parallel with the plane thereof.

The vibration target component 1 is, e.g., a rectangular panel-shaped touch panel body that allows a user to perceive the sense of operation and information through vibration generated by the vibration generation apparatus A other than the sense of vision and hearing.

Note that an accessory 13 such as a semiconductor device or other electronic components is mounted on the back side of the vibration target component 1.

Figure 3:
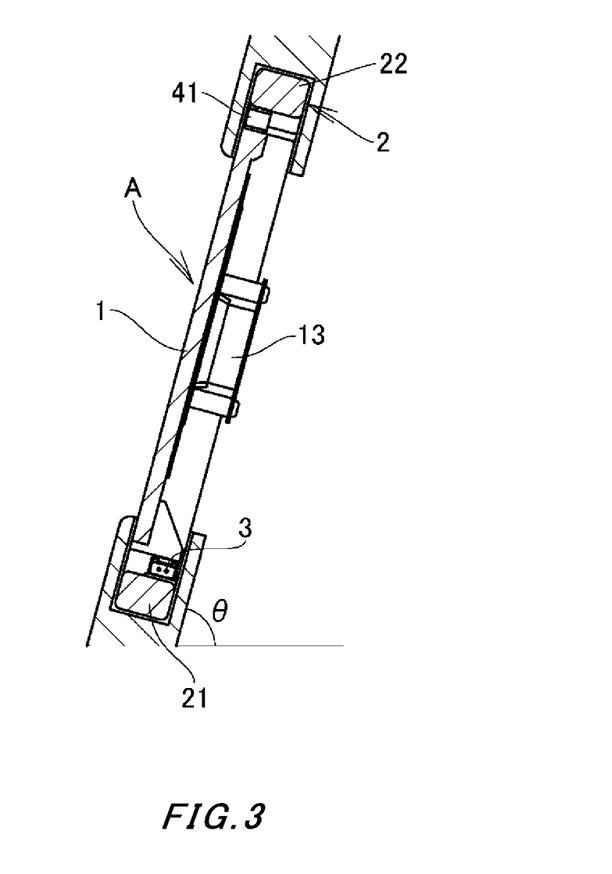
FIG. 3 is a cross-sectional view for the purpose of describing use of the vibration generation apparatus of electronic equipment as describe above.

Moreover, as illustrated in FIG. 3, the vibration target component 1 can be, depending on a use pattern of the electronic equipment, disposed standing such that a desired angle θ(θ=0° to 90°) between the surface of the vibration target component 1 and the horizontal plane is formed.

Thus, in the vibration generation apparatus A, the position of the center of gravity of the vibration target component 1 and the load acting on the actuator 3 vary depending on, e.g., the installation angle θ of the vibration target component 1 and arrangement of the accessory 13, and accordingly, the spring characteristics (e.g., the spring pressure and the number of vibration) of the biasing unit 4 and the biasing direction of the biasing unit 4 are determined.

For example, as illustrated in FIG. 1, the holder 2 is formed in a rectangular frame shape slightly larger than the vibration target component 1 such as the touch panel body. The holder 2 includes long-side portions arranged in parallel with each other and short-side portions each connecting end portions of the long-side portions. Part of the frame body, i.e., each long-side portion in the present embodiment, serves as each of the receivers 21, 22.

As illustrated in FIGS. 4 to 6B, the actuator 3 includes a base member 31 having an operation base with one or more operation recesses 311 and fixed to the receiver 21, and a movable member 32 disposed to face the base member 31 and having, on the side facing the base member 31, operation raised portions 321 to be inserted into the respective operation recesses 311. A linear or strip-shaped shape-memory alloy member 33 shrinkable by heat generated in power distribution is interposed between the base member 31 and the movable member 32. In response to shrinkage of the shape-memory alloy member 33 by power distribution, the movable member 32 is separated away from the base member 31 to push the vibration target component 1 in parallel with the plane thereof.

Figure 4:
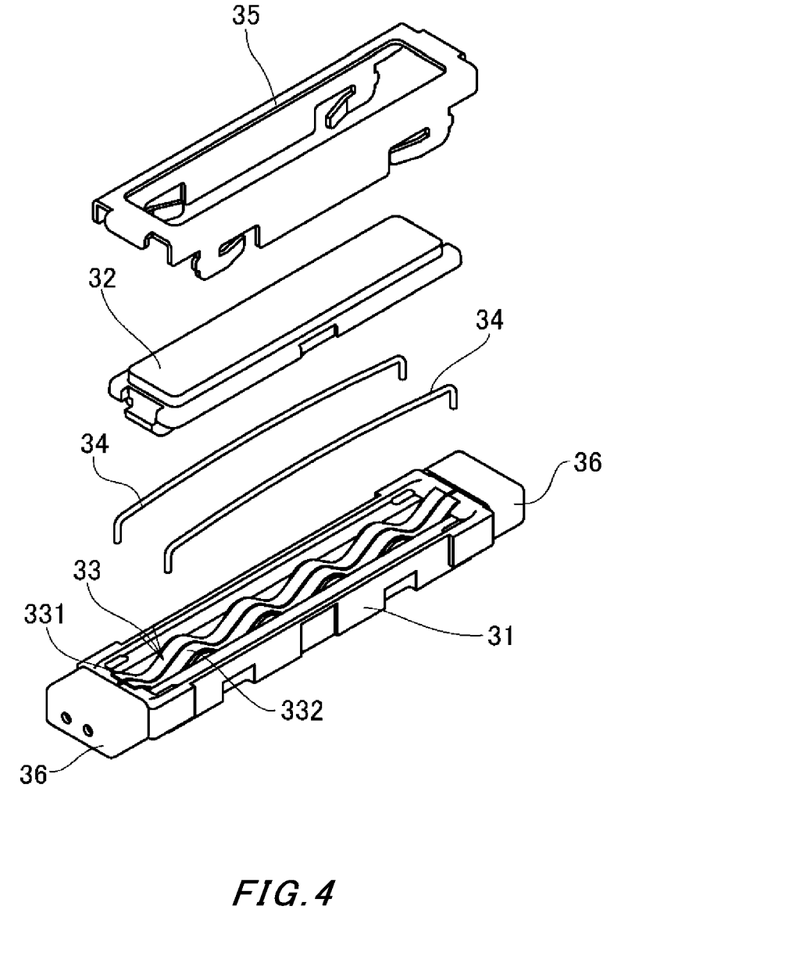
FIG. 4 is an enlarged exploded perspective view illustrating an actuator of FIG. 1.

The actuator 3 further includes spring bodies 34 supported by the base member 31, and the spring bodies 34 bias the movable member 32 in the direction away from the base member 31. Note that a reference numeral "35" in the figure denotes a cover configured to hold the movable member 32 such that the movable member 32 is movable on the base member 31 and is undetachable from the base member 31.

The actuator 3 further includes terminal metals 36 each engaging with a corresponding one of end portions of the base member 31 and each fixing a corresponding one of end portions of the shape-memory alloy member 33 to the base member 31. Power is distributed to the shape-memory alloy member 33 via the terminal metals 36.

Each terminal metal 36 is soldered to a corresponding one of terminals 211 exposed at the inner peripheral surface of the receiver 21 of the holder 2. Thus, the base members 31 of the actuators 3 can be fixed to the receiver 21, and power can be distributed to actuators 3 via the terminals 211.

The shape-memory alloy member 33 includes a shape-memory alloy wire 331 made of alloy, such as nickel-titanium alloy, exhibiting a shape-memory effect, i.e., made of shape-memory alloy, and a strip-shaped cover member 332 covering the outside of the shape-memory alloy wire 331. Even in deformation under a predetermined temperature, the shape-memory alloy wire 331 shrinks by heat generated in power distribution to the shape-memory alloy wire 331.

Figure 5:
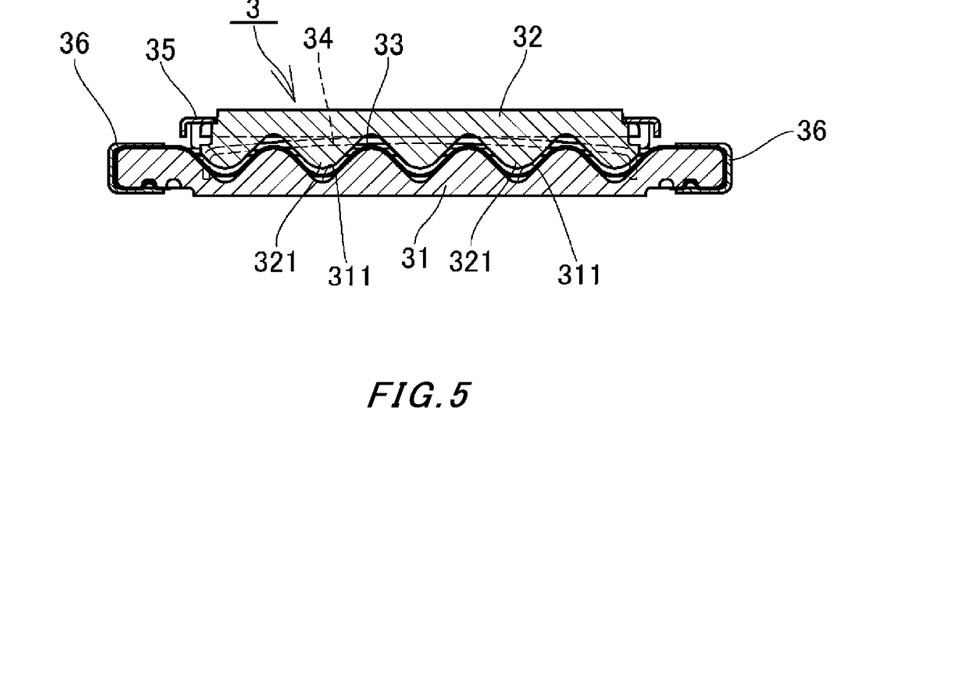
FIG. 5 is a cross-sectional view illustrating an unmounting state of the actuator as described above.

In the state in which the biasing units 4 do not bias the vibration target component 1 in the pushing-back direction, each actuator 3 is, as illustrated in FIG. 5, in such a state that the spring bodies 34 supported by the base member 31 bias the movable member 32 in the direction away from the base member 31 and that the operation raised portions 321 of the movable member 32 are lifted above the operation recesses 311 of the base member 31 and the shape-memory alloy member 33 curved in a corrugated shape.

Figure 6A:
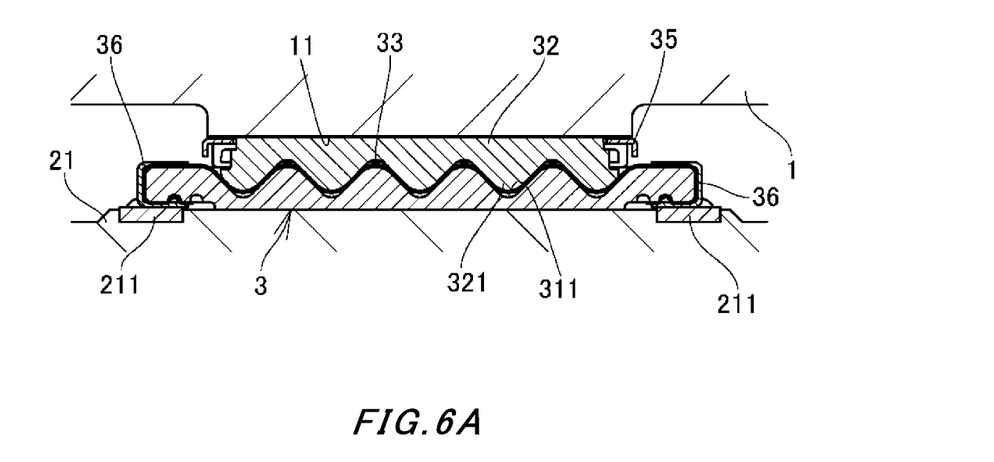
FIG. 6A is a cross-sectional view for the purpose of describing operation of the actuator as described above.

In the vibration generation apparatus A, the biasing units 4 supported by the other receiver 22 bias the other side surface 12 of the vibration target component 1 in the pushing-back direction. Accordingly, as illustrated in FIG. 6A, an end surface of the movable member 32 is pushed against one side surface 11 of the vibration target component 1 while the movable member 32 is pushed back toward the base member 31 against the biasing force of the spring bodies 34. This results in the state in which the movable member 32 contacts the shape-memory alloy member 33 when power is not distributed.

Figures 6B, 7:
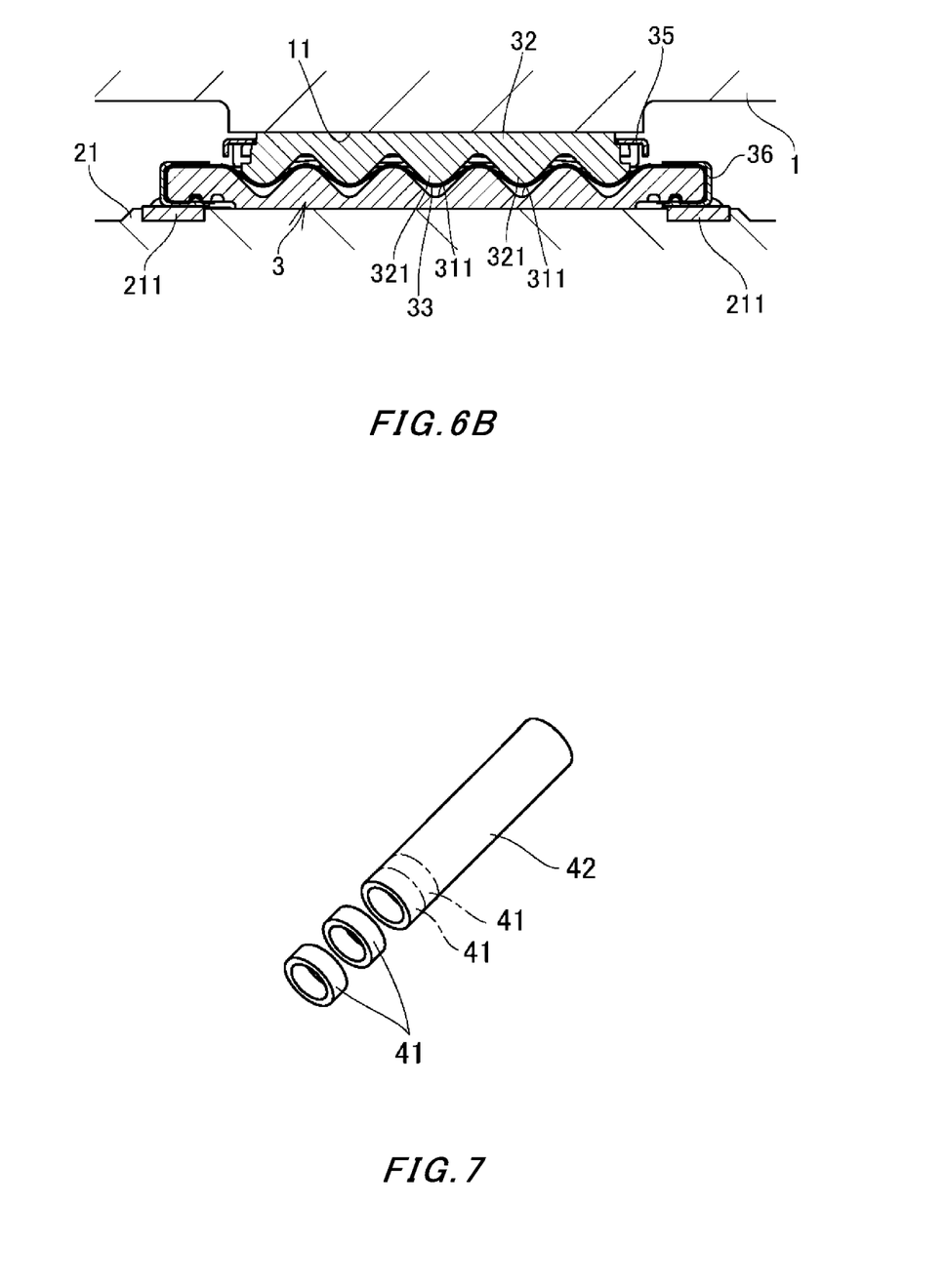
FIG. 6B is a cross-sectional view for the purpose of describing operation of the actuator as described above.
FIG. 7 is a perspective view illustrating the method for forming elastic members of FIG. 1.

When power is distributed to the actuators 3, i.e., voltage is applied between the terminal metals 36, to apply current to the shape-memory alloy member 33, the shape-memory alloy member 33 exhibits the shape-memory effect, i.e., the shape-memory alloy member 33 shrinks by heat generated by power distribution. As illustrated in FIG. 6B, the position, in a surface facing direction, of part of the shape-memory alloy member 33 contacting the tops of the operation raised portions 321 is displaced toward the movable member 32. In response to such displacement, the movable member 32 is pushed by the shape-memory alloy member 33 via the operation raised portions 321, and then, relatively moves in the direction away from the base member 31. Accordingly, the movable member 32 pushes out the side surface 11 of the vibration target component 1.

The biasing unit 4 includes one or more insulating elastic members 41 opening at both ends thereof and formed in a tubular shape. The elastic members 41 are interposed between the receiver 22 and the side surface 12 of the vibration target component 1 such that the opening end surfaces thereof are positioned in parallel with the plane of the vibration target component 1 and are compressed in a tube diameter direction.

The tube thickness of the elastic member 41, the end surface shape of the elastic member 41, the length of the elastic member 41 in the axial direction thereof, and the number of elastic members 41 are optionally selected so that the biasing unit 4 can exhibit desired spring characteristics.

As illustrated in FIG. 7, each elastic member 41 is formed in such a manner that a long tube 42 integrally molded from a high-elasticity insulating material such as rubber is cut into rings having a desired length according to required spring characteristics (e.g., spring pressure).

Figure 8A:
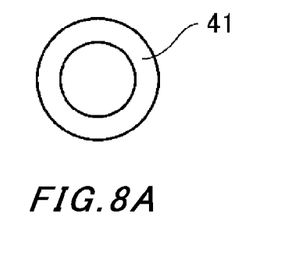
FIG. 8A is an enlarged plan view illustrating opening end surface shapes of the elastic member.

The elastic member 41 is not limited to a circular tube illustrated in FIG. 8A. The elastic member 41 may be a triangular tube illustrated in FIG. 8C or a rectangular tube illustrated in FIG. 8D. These elastic members 41 having different shapes may be combined together according to the required spring characteristics.

Figure 8B:
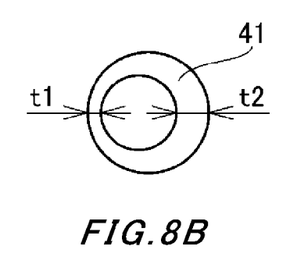
FIG. 8B is an enlarged plan view illustrating opening end surface shapes of the elastic member.
Figure 8C:
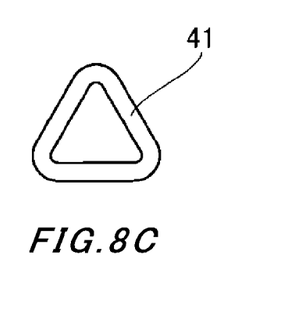
FIG. 8C is an enlarged plan view illustrating opening end surface shapes of the elastic member.
Figure 8D:
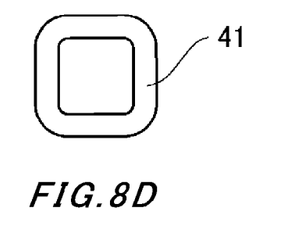
FIG. 8D is an enlarged plan view illustrating opening end surface shapes of the elastic member.

As illustrated in FIG. 8B, the elastic member 41 may have such an asymmetric end surface shape that the thickness t1, t2 of a wall portion in the tube diameter direction intersecting a compression direction varies according to location.

In the elastic member 41 as illustrated in FIG. 8B, the asymmetric end surface shape allows biasing force to act on the side surface 12 in a diagonal direction. Thus, the balance in the biasing direction is adjustable even if the installation position of the biasing unit 4 is limited by a change in the position of the center of gravity of the vibration target component 1 due to a change in arrangement of the accessory 13 and design limitations, for example.

In the vibration generation apparatus A of electronic equipment configured as described above, the biasing unit 4 includes the tubular elastic members 41, and, e.g., metal coil springs are not used. In addition, a spring constant can be lower. For this reason, the space in the compression direction, i.e., the space between the vibration target component 1 and the receiver 21, can be narrowed, resulting in size reduction of the entire apparatus.

Moreover, in the vibration generation apparatus A, since the tubular elastic members 41 are used for the biasing unit 4, the spring constant and the number of vibration can be lower. For this reason, excellent shock absorbing characteristics can be exhibited. For example, in the case of receiving external force as in a vehicle-mountable touch panel, unexpected vibration or shock caused due to the external force can be suitably absorbed by the elastic members 41.

Further, in the vibration generation apparatus A, since the elastic member 41 is formed in the tubular shape in such a manner that the molded long tube is cut into the rings having the desired length, the elastic member 41 is low cost and has excellent versatility. The tube thickness of the elastic member 41, the end surface shape of the elastic member 41, the length of the elastic member 41 in the axial direction thereof, and the number of elastic members 41 are, for example, optionally selected and combined together so that the spring characteristics (e.g., the spring pressure and the number of vibration) and the biasing direction (the installation position of the biasing unit 4) can be easily adjusted.

Thus, in the vibration generation apparatus A, the spring characteristics and the installation position according to various conditions such as the installation angle θ of the vibration target component 1, the position of the center of gravity of the vibration target component 1 in association with, e.g., arrangement of the accessory 13, the load acting on the actuator 3, the shape of the vibration target component, and the design limitations on, e.g., the installation position of the elastic member can be easily achieved. Consequently, it is easy to cope with test production and design change.

Further, in the vibration generation apparatus A, since the elastic members 41 are arranged such that the opening end surfaces thereof are positioned in parallel with the plane of the vibration target component 1, thickness reduction can be achieved without a deformation space formed in the thickness direction of the vibration target component 1.

Moreover, since the elastic member 41 is the tubular insulating member, secondary processing such as thermal treatment and plating is not required, and rust etc. is not caused. Further, even if the elastic member 41 is detached from the frame and dropped onto, e.g., a substrate, short circuit of components on the substrate is not caused.

In addition, since the elastic member 41 is made of insulating resin, abnormal noise and operation noise caused due to metal torsion can be eliminated. Further, since the elastic members 41 in storage are not tangled with each other, it is easy to handle the elastic members 41 in manufacturing, and deformation and spring characteristic variation due to such deformation can be prevented.

Note that in the above-described embodiment, the example of forming the holder 2 in the rectangular frame shape has been described, but the form of the holder 2 is not limited to that of the above-described embodiment. A pair of receivers may be arranged in parallel with each other, or a structure equivalent to the holder 2 may be formed integrally with, e.g., an outer case of the electronic equipment.

Note that in the above-described embodiment, the example of the touch panel body as the vibration target component 1 has been described, but the vibration target component 1 is not limited to the touch panel body. For example, the vibration target component 1 may be a component forming a touch pad, a smart phone, or other types of electronic equipment, or may have a shape other than the panel shape.

DESCRIPTION OF REFERENCE SIGNS

A vibration generation apparatus
1 vibration target component
2 holder
21, 22 receiver
3 actuator
31 base member
32 movable member
33 shape-memory alloy member
34 spring body
35 cover
36 terminal metal
4 biasing unit
41 elastic member
42 tube

The invention claimed is:

1. A vibration generation apparatus of electronic equipment comprising: a holder including a receiver disposed with a distance from a vibration target component on an outside thereof; an actuator supported by the receiver and configured to push out one side surface of the vibration target component; and a biasing unit supported by the receiver and configured to bias the other side surface of the vibration target component in a pushing-back direction, the vibration generation apparatus of electronic equipment being configured to repeat a pushing-out operation by the actuator and a pushing-back operation by the biasing unit to vibrate the vibration target component, wherein
the biasing unit includes one or more insulating elastic members opening at both ends thereof and formed in a tubular shape, and the elastic members are interposed between the receiver and the vibration target component side surface in a state in which the elastic members are compressed in a tube diameter direction.

2. The vibration generation apparatus of electronic equipment according to claim 1, wherein the elastic members are arranged such that opening end surfaces thereof are positioned in parallel with a plane of the vibration target component.

3. The vibration generation apparatus of electronic equipment according to claim 1, wherein each elastic member is formed to have such an asymmetric end surface shape that a thickness of a wall portion in the tube diameter direction varies according to a location.

4. The vibration generation apparatus of electronic equipment according to claim 1, wherein each elastic member is formed in such a manner that a long tube is cut into rings having a desired length according to a required spring characteristic.

5. The vibration generation apparatus of electronic equipment according to claim 1, wherein the actuator includes a base member having an operation base with one or more operation recesses and fixed to the receiver, and a movable member disposed to face the base member and having, on a side facing the base member, one or more operation raised portions to be inserted into the respective operation recesses, a linear or strip-shaped shape-memory alloy member shrinkable by heat generated in power distribution is interposed between the base member and the movable member, and in response to shrinkage of the shape-memory alloy member by the power distribution, the movable member is separated away from the base member to push the vibration target component.

* * * * *